United States Patent [19]
Ekiner et al.

[11] Patent Number: 5,820,659
[45] Date of Patent: Oct. 13, 1998

[54] MULTICOMPONENT OR ASYMMETRIC GAS SEPARATION MEMBRANES

[75] Inventors: Okan Max Ekiner; Gregory Kendall Fleming, both of Wilmington, Del.

[73] Assignee: L'Air Liquide, Societe Anonyme Pour L'Etude Et, L'Exploitation des Procedes Georges Claude, Paris, France

[21] Appl. No.: 826,250

[22] Filed: Mar. 28, 1997

Related U.S. Application Data

[62] Division of Ser. No. 465,304, Jun. 5, 1995, Pat. No. 5,618,332, which is a division of Ser. No. 246,201, May 19, 1994, Pat. No. 5,468,430.

[51] Int. Cl.⁶ .......................... B01D 53/22; B01D 71/64; B01D 71/68
[52] U.S. Cl. ............................ 96/8; 96/10; 96/12; 96/13; 96/14
[58] Field of Search ................................ 264/28, 41, 45.9, 264/171.26, 203, 209.3, 209.5; 96/8, 10, 12, 13, 14

[56] References Cited

U.S. PATENT DOCUMENTS

| 5,085,676 | 2/1992 | Ekiner et al. | 96/13 |
| 5,085,774 | 2/1992 | Ekiner et al. | 96/10 |

*Primary Examiner*—Leo B. Tentoni
*Attorney, Agent, or Firm*—Linda K. Russell

[57] ABSTRACT

Gas separation membranes having enhanced selectivity for a mixture of gases is disclosed. The membranes may be asymmetric or multicomponent. The membranes surprisingly provide selectivity for gases in a mixture that approaches the relative selectivity of the single gas components. Preferably the membrane provides selectivity for a mixture of gases which is at least 65%, preferably 80%, of the relative selectivity of the corresponding single gases. A process for making improved gas separation membranes is also disclosed.

3 Claims, No Drawings

MULTICOMPONENT OR ASYMMETRIC GAS SEPARATION MEMBRANES

This is a divisional of application Ser. No. 08/465,304, filed Jun. 5, 1995, (now U.S. Pat. No. 5,618,332) which is a divisional of U.S. Ser. No. 08/246,201, filed May 19, 1994, issued Nov. 21, 1995 as U.S. Pat. No. 5,468,430.

FIELD OF THE INVENTION

The present invention relates to composite or asymmetric gas separation membranes, particularly, gas separation membranes in which the selectivity of gases in gas mixtures approaches their corresponding single gas selectivity; and a process for the fabrication of such membranes.

BACKGROUND OF THE INVENTION

The separation of one or more gases from a complex multicomponent mixture of gases is necessary in a large number of industries. Such separations currently are undertaken commercially by processes such as cryogenics, pressure swing adsorption and membrane separations. In certain types of gas separations, membrane separations have been found to be economically more viable than other processes.

In a pressure driven gas membrane separation process, one side of the gas separation membrane is contacted with a complex multicomponent gas mixture and certain of the gases of the mixture permeate through the membrane faster than the other gases. Gas separation membranes thereby allow some gases to permeate through them while serving as a barrier to other gases in a relative sense. The relative gas permeation rate through the membrane is a property of the membrane material composition and its morphology. It has been suggested in the prior art that the intrinsic permeability of a polymer membrane is a combination of gas diffusion through the membrane, controlled in part by the packing and molecular free volume of the material, and gas solubility within the material. Selectivity is determined by dividing the permeabilities of two gases being separated by a material. It is also highly desirable to form defect-free dense separating layers in order to retain high gas selectivity.

In gas separations, it is also advantageous to use membranes which possess the desired properties of selectivity, flux, and mechanical strength to withstand prolonged operation at high temperatures and pressures. Furthermore, in order for gas separations to be commercially viable, it is advantageous to use membranes that can be manufactured in large quantities at high product quality, and which can be inexpensively assembled into a permeator.

The preparation of commercially viable gas separation membranes has been greatly simplified with asymmetric membranes. Asymmetric membranes are prepared by the precipitation of polymer solutions in solvent-miscible nonsolvents. Such membranes are typified by a dense separating layer supported on an anisotropic substrate of a graded porosity and are generally prepared in one step. Examples of such membranes and their methods of manufacture are disclosed in U.S. Pat. Nos. 4,113,628; 4,378,324; 4,460,526; 4,474,662; 4,485,056; and 4,512,893. U.S. Pat. No. 4,717,394 shows preparation of asymmetric separation membranes from selected polyimides.

Composite gas separation membranes typically have a dense separating layer on a preformed microporous substrate. The separating layer and the substrate are usually different in composition. Examples of such membranes and their methods of manufacture are disclosed in U.S. Pat. Nos. 4,664,669; 4,689,267; 4,741,829; 2,947687; 2,953,502; 3,616,607; 4,714,481; 4,602,922; 2,970,106; 2,960,462; and 4,713,292.

Composite gas separation membranes have evolved to a structure of an ultrathin, dense separating layer supported on an anisotropic, microporous substrate. These composite membrane structures can be prepared by laminating a preformed ultrathin dense separating layer on top of a preformed anisotropic support membrane. Examples of such membranes and their methods of manufacture are disclosed in U.S. Pat. Nos. 4,689,267; 4,741,829; 2,947,687; 2,953,502; 2,970,106; 4,086,310; 4,132,824; 4,192,824; 4,155,793; and 4,156,597.

Composite gas separation membranes are generally prepared by multistep fabrication processes. Typically, the preparation of composite gas separation membranes require first forming an anisotropic, porous substrate. This is followed by contacting the substrate with a membrane-forming solution. Example of such methods are shown in U.S. Pat. Nos. 4,826,599; 3,648,845; and 3,508,994. U.S. Pat. No. 4,756,932 shows forming composite hollow-fiber membranes by dip coating. Alternatively, composite hollow-fiber membranes may also be prepared by co-extrusion of multiple polymer solution layers, followed by precipitation in a solvent-miscible nonsolvent.

The hollow-fiber spinning process depends on many variables which may affect the morphology and properties of the hollow-fiber membrane. These variables include the composition of the polymer solution employed to form the fiber, the composition of fluid injected into the bore of the hollow-fiber extrudate during spinning, the temperature of the spinneret, the coagulation medium employed to treat the hollow-fiber extrudate, the temperature of the coagulation medium, the rapidity of coagulation of the polymer, the rate of extrusion of the fiber, takeup speed of the fiber onto the takeup roll, and the like.

A particular problem has been observed during the use of asymmetric and composite membranes for the separation of gas mixtures. In particular, the selectivity of gas separation membranes is significantly poorer for mixed gas separations than the corresponding ratio of the single gas permeabilities. For example, in a polyimide gas separation membrane with a feed stream containing 90% $N_2$ and 10% $CO_2$, at room temperature the selectivity for $CO_2/N_2$ may be about 20; whereas the ratio of single gas permeability for $CO_2$ to the permeability for $N_2$ may be about 40. A need therefore exists for a membrane and a process of manufacture which avoids the above shortcomings of the prior art membranes and processes. The present invention is directed to improved membranes, particularly hollow-fiber membranes and their methods of manufacture. The invention, although applicable to membranes generally, has particular utility to hollow-fiber asymmetric and composite membranes. The improved hollow-fiber membranes are produced by varying the spinning solution formulations and the spinning process conditions to achieve the desired fiber morphology to provide fibers that have improved permeation properties and mechanical strength. The fiber membranes are especially useful in gas separations that require the use of high feed pressures.

SUMMARY OF THE INVENTION

The invention provides a gas separation membrane prepared by the process of extruding one or more film-forming polymer solutions to form a nascent membrane, followed by precipitation to from a membrane. The membrane may be asymmetric or composite. The film-forming polymer is not limited and may be selected from polymers such as polysulfones, polyethersulfones, polyetherimides, polyimides or polyamides. The nascent membrane can be optionally partially dried prior to coagulating the membrane in a fluid bath. The nascent membrane is quenched and then the remainder of the solvent may be removed to form the gas separation membrane.

The membranes may be formed into hollow fibers, as well as shapes such as films. The composite membranes have at least two components comprising a first layer material for supporting a second, separating layer for separating gases. The second layer can be in the form of an asymmetric membrane which contains a dense gas separating layer on the exterior surface of the membrane.

The improved gas separation membranes are produced by adjusting the morphology of the membrane. It is believed that advantageous properties are achieved by reducing the free volume in the dense separating layer of the membrane, which minimizes the dual mode competition for the fast and the slow gases for soprtion and transport in the glassy polymer matrix.

It is generally observed that high flux membranes possessing high free volume in the separating structure of the membrane which are more prone to dual mode competition exhibit higher depression in the mixed gas $CO_2$ flux and the $CO_2$ (10%)/$N_2$ (90%) selectivity. This dual mode competition is described in an article entitled Reversible Isopentane-Induced Depression of Carbon Dioxide Permeation through Polycarbonate by R. T. Chern, W. J. Koros, H. B. Hopfenberg, and V. T. Stannett; Department of Chemical Engineering, North Carolina State University, Raleigh, N.C. 27650, *Journal of Polymer Science; Polymer Physics Edition*, Vol. 21, 753–763 (1983). The depression in the mixed gas selectivity is reduced with decreasing concentration of the slow gas in the feed mixture.

The desired membrane morphology is obtained by adjusting the spinning polymer solution formulations and the spinning process conditions. In particular, advantageous properties may be obtained by increasing the weight percent of polymer in the spin dope solution, increasing the spinneret temperature, increasing the residence time of the nascent membrane in the air gap and/or lowering the temperature of the quench bath.

The preferred process for making a multicomponent gas separation membrane of the invention comprises the steps of:

a. dissolving first polymer(s) in a suitable solvent to form a core solution;

b. dissolving second polymer(s) in a solvent to form a sheath solution having at least 26, preferably 27–35, most preferably 27–29, weight percent polymer;

c. coextruding the core and sheath solutions at a temperature of greater than 80° C., preferably 85°–100° C., through a spinneret having at least one hollow fiber spinning orifice to provide at least one nascent multicomponent hollow fiber membrane;

d. drawing said nascent multicomponent hollow fiber membrane through an air gap of more than 2.0 cm, preferably more than 5 cm, most preferably 7–10 cm;

e. introducing said nascent multicomponent hollow fiber membrane into a coagulation bath having a temperature of less than 25° C., preferably 0°–20° C., most preferably 5°–15° C., to solidify the nascent multicomponent hollow fiber membrane into a hollow fiber membrane.

A corresponding process may also be used to make an asymmetric gas separation membrane.

Although it is generally known in the art that these process parameters may be adjusted to alter the flux and selectivity of the membrane fiber, it has, surprisingly, been discovered that the selectivity of the fiber produced by the present invention is improved such that the selectivity of gases in a mixture approaches the relative selectivity of single gases. The preferred membrane provides selectivity for a mixture of gases which is at least 65%, preferably 80%, most preferably at least 90% of the relative selectivity of the corresponding single gases.

DETAILED DESCRIPTION OF THE INVENTION

Components of the Membrane

The present invention allows for manufacture of improved multicomponent and asymmetric gas separation membranes. In manufacture of the membranes, a wide range of materials may be used as the gas separating layer. These materials include polyamides, polyimides, polyesters, polycarbonates, copolycarbonate esters, polyethers, polyetherketones, polyetherimides, polyethersulfones, polysulfones, polyvinylidene fluoride, polybenzimidazoles, polybenzoxazoles, polyacrylonitrile, cellulosic derivatives, polyazoaromatics, poly(2,6-dimethylphenylene oxide), polyphenylene oxides, polyureas, polyurethanes, polyhydrazides, polyazomethines, polyacetals, cellulose acetates, cellulose nitrate, ethyl cellulose, styrene-acrylonitrile copolymers, brominated poly(xylylene oxide), sulfonated poly(xylylene oxide), tetrahalogen-substituted polycarbonates, tetrahalogen-substituted polyesters, tetrahalogen-substituted polycarbonate esters, polyquinoxaline, polyamideimides, polyamide esters, polysiloxanes, polyacetylenes, polyphosphazenes, polyethylenes, poly4-methylpentene), poly(trimethylsilylpropyne), poly(trialkylsilylacetylenes), polyureas, polyurethanes, blends thereof, copolymers thereof, substituted materials thereof, and the like. It is further anticipated that polymerizable substances, that is, materials which cure to form a polymer, such as vulcanizable siloxanes and the like, may be suitable for making the gas separation membranes of the present invention. Preferred materials for the dense gas separating layer of multicomponent membranes include aromatic polyamide and aromatic polyimide compositions, such as those described in U.S. Pat. No. 5,085,676.

Suitable substrate layer materials for multicomponent membranes of the present invention may include polysulfone, polyethersulfone, polyamide, polyimide, polyetherimide, polyesters, polycarbonates, copolycarbonate esters, polyethers, polyetherketones, polyvinylidene fluoride, polybenzimidazoles, polybenzoxazoles, cellulosic derivatives, polyazoaromatics, poly2,6-dimethylphenylene oxide), polyarylene oxide, polyureas, polyurethanes, polyhydrazides, polyazomethines, cellulose acetates, cellulose nitrates, ethyl cellulose, brominated poly(xylylene oxide), sulfonated poly(xylylene oxide), polyquinoxaline, polyamideimides, polyamide esters, blends thereof, copolymers thereof, substituted materials thereof and the like. This should not be considered limiting because any materials which can be fabricated into an anisotropic substrate membrane may find utility as the substrate layer of the present invention. Preferred materials for the substrate layer include polysulfone, polyethersulfone, polyetherimide, polyimide and polyamide compositions. Especially preferred substrate materials are described in U.S. Pat. No. 5,085,676.

The polymers for an asymmetric membrane and for both the substrate gas separating layer of a multicomponent membrane should have a sufficiently high molecular weight to be film forming.

Gas separation membranes of the present invention may be in the form of various shapes such as flat membranes or hollow-fiber membranes. The membrane is preferably in the form of a hollow fiber due to the surface area advantages available. The flat film membranes may be prepared through coextrusion of the polymer solutions for the separating and support layers to form a nascent multilayer membrane.

Fabrication of inventive Membranes

For the purpose of illustrating the invention, the following discussion exemplifies forming multicomponent membranes with two components, that is, a gas separating component and a substrate component. This should not be considered limiting, however, because this method is useful for forming asymmetric membranes. In addition, the multicomponent membranes of the present invention may incorporate more than two component layers. The additional layers may function as gas separating layers, structural layers, compatibilizing layers, substrate layers, layers which reduce environmental concerns, or combinations thereof. These additional layers may contain the materials employed in the gas separating layer and the substrate layer.

The materials of each layer of the multicomponent membrane should be sufficiently compatible to ensure integrity of the composite membrane during processing or when employed in gas separations.

Multicomponent hollow fiber membranes in the form of hollow fibers may be formed by coextrusion of the support polymer and separating polymer solutions. For example, polymer solutions for the layers may be coextruded through a multiple channel spinneret while maintaining a gas pressure or a bore fluid in the nascent hollow fiber bore to maintain the fiber's structural integrity. Such multiple channel spinnerets have been described in the prior art for use in melt extrusion of multicomponent fibers.

Coextrusion, and the apparatus and processes therein, of polymers is well known in the art. The improved invention for the fabrication of gas separation membranes, however, is novel and surprising.

During fabrication of the hollow fiber membranes, the separating layer is preferably formed on the outside surface of the fiber to maximize the membrane surface area exposed to the gas. However, the separating layer also may be formed as the inner layer of fiber. The multicomponent hollow fiber membrane of the present invention may have an outside diameter of about 75 to 1,000 microns, preferably 100 to 350 microns, and a wall thickness of about 25 to 300 microns, preferably 25 to 75 microns. Preferably, the diameter of the bore of the fiber is about one-half to three-quarters of the outside diameter of the fiber.

The porosity of the resultant membrane is sufficient so that the void volume of the membrane is within the range of 10 to 90 percent, preferably about 30 to 70 percent, based on the volume contained within.

The polymers employed in the preparation of the hollow fiber membranes have sufficiently high molecular weight that the resultant spin dope formulations can be extruded through a spinneret to form a self-supporting hollow fiber which can be processed in the subsequent steps of the spinning process. Typical zero-shear viscosities of the spin does at 70° C. are in excess of several hundred poise, preferably in the range of 100 to 5000 poise.

As mentioned, the spin dope formulations are extruded through a spinneret to provide hollow fiber membranes. The combination of the volumetric rate of supply (measured in terms of cubic centimeters of dope/unit time) of the spin dope to the spinneret and the rate of fiber take up can be varied to control production rate, fiber size, morphology and draw ratio. Preferably, the volume rate of supply of the dope is 50 to 500 cc/minute, most preferably, 100 to 300 cc/minute.

The spinnerets employed in the process of the invention are maintained during extrusion at a temperature sufficient to attain a viscosity of the spin dope sufficient to facilitate draw down of the nascent fiber. Generally, the spinneret may be maintained at 40° to 130° C., preferably 60° to 100° C.

During extrusion of one polymer solution through a hollow fiber spinneret, a bore fluid is injected within the bore of the fiber to facilitate generation of the hollow fiber configuration. The bore fluid can be a mixture of a solvent and a nonsolvent for the polymer to provide a slow rate of coagulation and to permit draw down of the fiber, or it can be an inert gas such as $N_2$. Suitable bore fluids include, but are not limited to, water N-methylpyrollidone (NMP), diemethyl formamide (DMF), and dimethyacetamide (DMAc). Preferably, the bore fluids include mixtures of solvents such as DMAc, NMP, DMF, and the like with water.

At the exit of the spinneret, the nascent fiber is briefly exposed to an air gap of a gaseous atmosphere immediately prior to contacting a fluid coagulation bath. The choice of pressure, temperature, composition of the atmosphere, as well as the time period of exposure of the fiber to the gaseous atmosphere are chosen to control the morphology of the nascent fiber.

Typically, the nascent fibers travels through the air-gap at room temperature. The temperature of the air gap medium can be varied to facilitate evaporation of the solvent from the nascent fiber. Generally, the air gap may be at ambient, as well as elevated temperatures. Preferably, the air gap temperature is at ambient temperature.

The composition of the gaseous atmosphere of the air-gap is generally chosen to facilitate evaporation of the solvent from the fiber. Possible gas compositions include, but are not limited to air, nitrogen, inert gases such as He, Ar, Xe and the like. Alternatively, pressures below atmospheric may be employed in the air gap. Preferably, air and inert gases an be employed in the air gap. Most preferably, air is employed in the air gap.

After contacting the gaseous atmosphere of the air gap, the fibers are passed into a coagulation bath to coagulate the fiber by extraction of the solvent prior to being wound onto a takeup roll. The choice of bath composition and temperature is made to control the rate of coagulation and morphology of the fiber. Possible compositions of the coagulation bath that may be employed in the invention include, but are not limited to water, aliphatic alcohols, mixtures of aliphatic alcohols, and mixtures of aliphatic alcohols with water. Other possible compositions for the coagulation bath include aqueous solutions of DMF, NMP, and DMAc. Preferably, the composition of the coagulation bath is a mixture of aliphatic alcohols and water. Most preferably, the bath composition is water. The temperature of the coagulation bath can be varied to control the rate of coagulation and fiber morphology. Generally, the bath is maintained at a temperature of less than 25° C., preferably 0° to 20° C., most preferably 5°–15° C. Suitable coagulation bath compositions for the nascent membranes vary depending on the composition of the polymer solutions employed and the results desired. Generally, the coagulation bath medium is miscible with the solvent or the solvent mixture of the spin dope, but is a non-solvent for the polymers. However, the coagulation bath may be varied to achieve desired properties in the individual layers of a composite membrane. For example, for a multicomponent membrane, the solvent of the separating layer polymer solution may be less miscible in the coagulation bath than the solvent of the substrate layer polymer solution allowing different rates of solvent extraction. A coagulation bath, therefore, may be a multicomponent mixture of water and an organic solvent that is miscible with water and the solvent to be removed from the polymer. The temperature and composition of the bath also may be controlled to affect the extent and rate of coagulation. After treatment of the fiber in the coagulation bath, the fibers are wound onto a takeup roll or other suitable collection device.

The ratio of the drawing speed of the fiber to the extrusion velocity of the fiber may be varied over wide limits. Generally, the rate of extrusion velocity of the fiber may vary from 2 to 100 meters/minute, preferably 3 to 50 meters/minute, most preferably 5 to 20 meters/minute. Similarly, the rate of drawing of the fiber may vary from 5 to 500 meters/minute, most preferably 50 to 150 meters/minute.

The nascent membrane is optionally dried under specified conditions and then precipitated in a coagulating bath that is a non-solvent for the polymer, but is a solvent of the polymer solvent. The nascent film can be optionally dried at from 10° C. to 200° C., preferably 25° C. to 100° C., for 0.01 to 10 minutes, preferably for 0.05 to 1.0 minutes, by passing the nascent film through an oven. The nascent film is then precipitated in the coagulating bath.

The resulting fiber membranes are washed to remove residual solvent and the like, whereafter they are dried. Typically, washing is accomplished by placing the fiber membranes into water at 25° C. to 100° C., preferably 25° C. to 75° C. for a period sufficient to remove substantially all residual solvent as well as other impurities such as residual additives in the spin dope. Thereafter, the fibers are air dried or dehydrated by solvent exchange. For example, the polyaramide fibers may be dehydrated by a two step solvent exchange dehydrated by first using methanol and then FREON F-113. Such methods of solvent exchange, are known in the art, as described in U.S. Pat. Nos. 4,080,743; 4,080,744; and 4,120,098. Alternatively, the fibers may be dehydrated by heating in atmosphere; such as air, and the like.

Typical solvents for the polymer solutions included solvents such as dimethyl formamide, N,N-dimethylacetamide, N-methylpyrrolidone, dimethyl sulfoxide and the like. These solvents are useful with the preferred polymer materials of the present invention, that is polysulfone, polyethersulfone, polyamide, polyimide and polyetherimide. These solvents, however, are merely illustrative and should not be considered limiting.

Mixtures of solvents also may be used in the polymer solutions employed to form the layers of the membrane. The specific mixture of solvents may vary. For example, two or more solvents may be used which vary in volatility or solvation power.

The solvent mixture also may contain additional components such as polymer swelling agents, and nonsolvent components. These added components may be useful, for example, to achieve a desired anisotropy in the morphology of the dense separating layer of the membrane by moving the polymer solution closer to its point of incipient gelation. These additional components may be characterized as extractable or nonextractable in the coagulation bath. Extractable components, that is, materials which are extractable in an aqueous-based coagulation bath, may be useful, for example, as pore formers in a layer. Examples of extractable components include inorganic salts, and polymers such as polyvinyl pyrrolidone. Examples of additional components which may be employed include, for example, discrete monomeric materials which are insoluble in the composition of the coagulation bath, polymerizable materials such as moisture-curable siloxanes, and compatible or non-compatible polymers. The foregoing examples of additional components are merely illustrative and should not be considered limiting. The fabrication processes employed to form the multicomponent membranes of the present invention generally depend on the major component of the membrane. For example, in manufacture of bicomponent hollow fiber membranes, selection of the spinning parameters depends on the spinability of the substrate layer solution. This means that bicomponent membranes formed by the present invention readily can be spun essentially under the same conditions as the underlying substrate layer.

Improved Properties

A surprising advantage provided by the present invention is its ability to produce asymmetric or multicomponent membranes having improved gas separation properties. It is believed that the advantageous properties of the present gas separation membranes are derived from the decreased free volume of the membrane for minimizing the dual mode competition for sorption and transport in the glassy polymer matrix. Free volume is the volume in a dense film which is available for gas sorption and transport. Free volume may be calculated by subtracting the volume occupied by vibrating macromolecules from the total macroscopic volume. High flux membranes possessing high free volume were found to be more prone to dual mode competition which depresses the mixed gas selectivity in application such as natural gas sweetening ($CO_2/CH_4$) and separations of carbon dioxide from nitrogen or air. The thickness of the membrane separating layer possessing reduced free volume is controlled to obtain the desired level of productivity.

In the prior art, others have sought to increase the free volume of gas separation membranes, as a means of increasing membrane productivity. In U.S. Pat. No. 4,880,441 Kesting et al. state that, "Until the present invention, only two options were available to increase the free volume in a given hydrophobic glassy polymer utilized for gas separations. First, membrane density can be decreased and free volume increased through swelling the film or membrane by exposure to $CO_2$ under pressure. Carbon dioxide under pressure acts as a swelling agent and at very high pressure, it can even act as a supercritical liquid solvent, thus the $CO_2$ lessens polymer-to-polymer interaction allowing the macromolecules to move farther apart from one another. For example, Erb and Paul, J. Membrane Sci., 8, 11 (1981) illustrated that the $CO_2$ absorption of melt-extruded polysulfone film is increased by exposure to $CO_2$ to 60 atm. Although not explicitly stated by Erb et al., increased $CO_2$ adsorption was due to increased free volume. Secondly, the polymer can be modified so as to inhibit close packing. Chern et al., Materials Science of Synthetic Membranes, ACS Symposium Series 269, D. Lloyd, ed. 1985: p. 40, showed that whereas films prepared from polysulfone which utilizes bisphenol A exhibits a P for $CO_2$ of 4.4 and an alpha for $CO_2/CH_4$ of 28; films prepared from polysulfone made with tetramethyl bisphenol A have a P for $CO_2$ of 21 with an alpha for $CO_2/CH_4$ of 68. The methyl groups in the latter polymer sterically inhibit a close approach between neighboring chains thereby increasing free volume and permeability."

Kesting et al. proceed to disclose an asymmetric gas separation membrane having a graded density skin and macrovoid-free morphology comprised of glassy, hydrophobic polymers having increased free volume.

The prior art does, however, not teach a method of extruding hollow-fiber gas separation membranes so as to provide controlled level of decreased free volume in the fiber separating layer morphology for obtaining high mixed gas selectivity, preferably at an economically viable level of productivity. In the simplest case, the invention can produce bicomponent membranes of a separating layer and a porous substrate layer. The separating layer may be dense or asymmetric. In addition, the present invention retains the advantages of the prior art by allowing gas separation membranes to be formed from separating materials which are otherwise impossible or very difficult to fabricate into commercially useful membranes. The present invention also advantageously enables the use of other membrane materials which have not been easily fabricated into useful commercial membranes due to solubility, solution viscosity or other rheological problems.

The membranes of the present invention possess superior gas separation properties. The multicomponent fiber membranes from ed in the present invention possess the superior gas separation properties of the separating layer while maintaining the ease of fabrication of the substrate layer.

Utility of the inventive Membranes

The novel membranes of the invention have use in a wide variety of gas separations. For example, the membranes of the present invention are useful for the separation of oxygen from air to provide enriched oxygen to provide enhanced combustion, and for the separation of nitrogen from air to provide inerting systems; in recovery of hydrogen from hydrocarbon gas in refinery and ammonia plants; separation of carbon monoxide from hydrogen in syngas systems; for separation of nitrogen from ammonia; and separation of carbon dioxide or hydrogen sulfide from hydrocarbons.

The novel multicomponent membranes of the present invention, however, are not limited to use in gas separations. Generally, all known membrane separations can benefit from utilizing the novel membranes described herein. For example, the membranes may find use in reverse osmosis, microfiltration, ultra-filtration or other separations such as bioseparations that require affinity of certain components in a complex mixture with the membrane to effect efficient separations. Materials with the required affinity generally are not easily manufactured into useful membranes. The current invention, however, enables efficient fabrication of such membranes.

EXAMPLES

In the following examples, all temperatures are set forth uncorrected in degrees Celsius; unless otherwise indicated, all parts and percentages are by weight.

The permeability of gases through isotropic dense film membranes is generally defined as the centiBarrer. A centiBarrer is the number of cubic centimeters of gas permeated by the membrane at standard temperature and pressure multiplied by the thickness of the membrane in centimeters divided by the time in seconds for permeation and the partial pressure difference across the membrane in centimeters of Hg, that is $$\text{centiBarrer} = 10^{-12} \frac{\text{cm}^3 \text{ (STP) cm}}{\text{cm}^2 \text{ sec cmHg}}$$

The flux of gases through an asymmetric membrane can be defined in terms of gas permeation units, GPU's, as $$GPU = 10^{-6} \frac{\text{cm}^3 \text{ (STP)}}{\text{cm}^2 \text{ sec cmHg}}$$

wherein the units are described above.

COMPARATIVE EXAMPLE 1

As taught in U.S. Pat. No. 5,085,676, a substrate solution containing 31% total weight of a polymer blend comprising 90:10 weight ULTEM® 1000 (commercially available from General Electric Co.) Polyimide and MATRIMID® 5218 (commercially available from Ciba Geigy Corp.) polyimide and 2.3% weight $LiNO_3$, 9.3% weight tetramethylenesulfone, 1.6% weight acetic anhydride and 0.3% weight acetic acid in N-methylpyrrolidone was coextruded at a rate of 104 cm$^3$/hr through a composite fiber spinneret with fiber channel dimensions of outer diameter equal to 559 microns (5.59×10$^{-4}$ m) and inner diameter equal to 254 microns (2.54×10$^{-4}$ m) at 80° C. A separating polymer solution containing 26% weight MATRIMID® 5218 polyimide, 7.8% weight tetramethylenesulfone, 1.3% weight acetic anhydride and 0.26% weight acetic acid in N-methyl-pyrrolidone was coextruded at a rate of 11.9 cm$^3$/hr. A solution containing 90% weight N-methylpyrrolidone in $H_2O$ was injected into the bore of the composite fiber at a rate of 46 cm$^3$/hr. The nascent filament traveled through an air-gap length of 4 cm at room temperature into a water coagulant bath maintained at 27° C. and was wound up at a rate of 90 meters/min. The spin draw ratio defined as the take-up velocity to the average extrusion velocity for this example was calculated to be 9. The water-wet fiber was washed with running water at 50° C. for about 12 hours and dehydrated as taught in U.S. Pat. No. 4,080,744 and U.S. Pat. No. 4,120,098. This specifically involved the replacement of water with methanol followed by the replacement of methanol with normal hexane and drying in a vacuum oven (2.67 kPa).

The fibers were treated to seal defects protruding through the dense separating layer as taught in U.S. Pat. No. 4,230,463. this treatment specifically involved contacting the outer surface of the fibers with a hexane solution containing 1% weight SYLGARD® 184. The exposure time of the fibers to each step of the posttreatment was 30 minutes at room temperature and a vacuum (2.67 kPa) in the fiber bore.

The fibers were tested for mixed gas $CO_2/N_2$ (10/90 mole) while applying 175 psi on the shell side of the fibers at 27° C. The results are reported below:

$CO_2$ Productivity=110 GPU $CO_2/N_2$ Selectivity=17

The same fibers were tested for single gas $CO_2$ and $N_2$ permeation properties at room temperature. Results are reported below:

Single Gas $CO_2$ Productivity=298 GPU

Single Gas $N_2$ Productivity=8.5 GPU

Single Gas $CO_2N_2$ Selectivity=35

The ratio of mixed gas selectivity to single gas selectivity is only 49%.

EXAMPLE 1

Composite fibers were spun by using the same substrate solution described in Comparative Example 1 with a separating polymer solution containing 28.5% weight MATRIMID® 5218 polyimide, 8.6% weight tetramethylenesulfone, 1.4% weight acetic anhydride and 0.29% weight acetic acid in N-methylpyrrolidone. The substrate and the separating layer solutions were coextruded through a composite fiber spinneret having the same fiber channel dimensions as describe din Comparative Example 1 at a rate of 216 cm³/hr respectively at 97° C. A solution containing 90% weight N-methylpyrrolidone in $H_2O$ was injected into the bore of the composite fiber at a rate of 48 cm³/hr. The nascent filament traveled through an air-gap length of 7.5 cm at room temperature into a water coagulant bath maintained at 10° C. and was wound up at a rate of 80 meters/min. The spin draw ratio for this example was calculated to be 3.9. The water-wet fiber was washed and dehydrated as described in Comparative Example 1.

The fibers were treated to seal defects as described in Comparative Example 1 and tested for mixed gas $CO_2/N_2$ (10/90 mole) while applying 175 psi on the shell side of the fibers at 27° C. The results are reported below:

$CO_2$ Productivity=50 GPU $CO_2/N_2$ Selectivity=30

The same fibers were tested for single gas $CO_2$ and $N_2$ permeation properties at room temperature. Results are reported below:

Single Gas $CO_2$ Productivity=97 GPU

Single Gas $N_2$ Productivity=2.7 GPU

Single Gas $CO_2/N_2$ Selectivity=36

The ratio of mixed gas selectivity to single gas selectivity is 83%.

COMPARATIVE EXAMPLE 2

A solution containing 27% weight MATRIMID® 5218, 5.4% weight THERMOGUARD® 230 (a brominated epoxy resin commercially available from M&T Chemical, Inc.), 1.4% weight acetic anhydride and 0.3% weight acetic acid in N-methylpyrrolidone was extruded through a spinneret having the same fiber channel dimensions as described in Comparative Example 1 at a rate of 200 cm³/hr at 75° C. A solution containing 85% weight n-methylpyrrolidone was injected into the bore of the fiber at a rate of 50 cm³/hr. The nascent fiber traveled through an air-gap length of 14 cms at room temperature into a water coagulant bath maintained at 6° C. and was wound up at a rate of 68 meters/min. The spin draw ratio for this example was calculated to be 4. The water wet fiber was washed and dehydrated as described in Comparative Example 1. The fibers were posttreated to seal defects as described in Comparative Example 1 and tested for mixed $CO_2/N_2$ at 25° C. and 175 psig. Results are reported below:

$CO_2$ Productivity=71 GPU $CO_2/N_2$ Selectivity=20

The same fibers were tested for single gas $CO_2$ and $N_2$ permeation properties at room temperature. Results are reported below:

Single Gas $CO_2$ Productivity=162 GPU

Single Gas $N_2$ Productivity=4.2 GPU

Single Gas $CO_2/N_2$ Selectivity=39

The ratio of mixed gas selectivity to single gas selectivity is only 51%.

EXAMPLE 2

This example describes an embodiment of the invention for the asymmetric hollow fibers.

A polymer solution containing 29% weight MATRIMID® 5218, 8.7% weight tetramethylenesulfone, 1.5% weight acetic anhydride, 3% weight acid and 0.9% weight LiCl in N-methylpyrrolidone is extruded through a spinneret having the same fiber channel dimensions as described in Comparative Example 1 at a rate of 200 cm³/hr at 97° C. A solution containing 90% weight N-methylpyrrolidone in $H_2O$ was injected into the bore of the fibers at a rate of 50 cm³/hr. The nascent filament travels through an air-gap length of 7.5 cm at room temperature into a water coagulant bath maintained at 6° C. and was wound up at a rate of 55 meters/min. The spin draw ratio for this case was calculated to be 3.2. The fibers were washed and dehydrated as described in Comparative Example 1 and posttreated by the procedure of Comparative Example 1 and tested for mixed gas $CO_2/N_2$ (10/90 mole) while applying 175 psig on the shell side of the fibers at 27° C. The results are reported below:

$CO_2$ Productivity=54 GPU $CO_2/N_2$ Selectivity=31

The same fibers were tested for single gas $CO_2$ and $N_2$ permeation properties. Results are reported below:

Single Gas $CO_2$ Productivity=90 GPU

Single Gas $N_2$ Productivity=2.3 GPU

Single Gas $CO_2N_2$ Selectivity=39

The ratio of mixed gas selectivity to single gas selectivity is advantageously 79%.

The spinning conditions and the resulting permeation properties for the membranes produced in the comparative examples and the examples are summarized in Table 1.

TABLE 1

| Example | % Solids Content | Spinneret (°C.) | Air Gap (cm) | Coagulation Bath Temp. (°C.) | Take-up (M/min) | Selectivity $CO_2/N_2$ (mixed gas) | Selectivity $CO_2$ (single gas)/$N_2$ (single gas) | Ratio of Mixed Gas Selectivity to single gas selectivity |
|---|---|---|---|---|---|---|---|---|
| Comparative Example 1 | 26 | 80 | 4 | 27 | 90 | 17 | 35 | 49% |
| Example 1 | 28.5 | 97 | 7.5 | 10 | 80 | 30 | 36 | 83% |

TABLE 1-continued

| Example | % Solids Content | Spinneret (°C.) | Air Gap (cm) | Coagulation Bath Temp. (°C.) | Take-up (M/min) | Selectivity $CO_2/N_2$ (mixed gas) | Selectivity $CO_2$ (single gas)/$N_2$ (single gas) | Ratio of Mixed Gas Selectivity to single gas selectivity |
|---|---|---|---|---|---|---|---|---|
| Comparative Example 2 | 27 | 75 | 14 | 6 | 68 | 20 | 39 | 51% |
| Example 2 | 29 | 97 | 7.5 | 6 | 55 | 31 | 39 | 79% |

What is claimed is:

1. A gas separation membrane prepared by the process comprising the steps of:
   a. dissolving first polymer or polymers in a suitable solvent to form a core solution;
   b. dissolving second polymer or polymers in a solvent to form a sheath solution having at least 27–35 weight percent of said second polymer or polymers;
   c. coextruding the core and sheath solutions at a temperature of 85°–100° C. through a spinneret having at least one hollow fiber spinning orifice to provide at least one nascent multicomponent hollow fiber membrane;
   d. drawing said nascent multicomponent hollow fiber membrane through an air gap of 7–9 cm at a draw ratio of 3.0–6.0;
   e. introducing said nascent multicomponent hollow fiber membrane into a coagulation bath at a temperature of 0°–20° C. to solidify the nascent multicomponent hollow fiber membrane into a hollow fiber membrane.

2. The gas separation membrane of claim 1, wherein the selectivity for two gases in a mixture of gases is at least 80% of the relative selectivity of the corresponding single gases in the mixture.

3. A gas separation membrane prepared by the process comprising the steps of:
   a. dissolving polymer or polymers in a solvent to form a sheath solution having 27–35 weight percent of said polymer or polymers;
   b. extruding the solution at a temperature of 85°–100° C. through a spinneret having at least one hollow fiber spinning orifice to provide at least one nascent hollow fiber membrane;
   c. drawing said nascent hollow fiber membrane through an air gas of 7–9 cm at a draw ratio of 3.0–6.0;
   d. introducing said nascent hollow fiber membrane into a coagulation bath at a temperature of 0°–20° C. to solidify the nascent hollow fiber membrane into a hollow fiber asymmetric membrane, wherein the selectivity for two gases in a mixture of gases is at least 65% of the relative selectivity of the corresponding single gases in the mixture.

* * * * *

UNITED STATES PATENT AND TRADEMARK OFFICE
CERTIFICATE OF CORRECTION

PATENT NO. : 5,820,659
DATED : October 13, 1998
INVENTOR(S) : Okan Ekiner, et al.

It is certified that error appears in the above-identified patent and that said Letters Patent is hereby corrected as shown below:

Column 14, line 24, change "gas" to --gap--.

Signed and Sealed this

Ninth Day of March, 1999

Attest:

Q. TODD DICKINSON

*Attesting Officer*    *Acting Commissioner of Patents and Trademarks*